Sept. 10, 1968  C. J. HOLTKAMP  3,400,886

THERMOSTAT ARRANGEMENT FOR HEAT CLEANING COOKING OVEN

Filed May 10, 1967

WITNESSES
Theodore F. Wrobel
James F. Young

INVENTOR
Calvin J. Holtkamp
BY
Edward C. Arenz
ATTORNEY

3,400,886
THERMOSTAT ARRANGEMENT FOR HEAT CLEANING COOKING OVEN
Calvin J. Holtkamp, Mansfield, Ohio, assignor to Westinghouse Electric Corporation, Pittsburgh, Pa., a corporation of Pennsylvania
Filed May 10, 1967, Ser. No. 637,566
4 Claims. (Cl. 236—15)

ABSTRACT OF THE DISCLOSURE

Thermostat apparatus for a heat cleaning type cooking oven in which a mercury filled sensing element operative to terminate heating in the oven in response to the upper temperature limit of the heat cleaning temperature range is disposed in a hollow tube fixed to the oven walls to project into the oven cavity. The tube is preferably closed on the inner end and serves to minimize the likelihood of damage to the mercury element and the possibility of loss of mercury into the oven if the element is ruptured, and finally introduces a thermal delay in the response of the element to intermittent combustion in the over cavity during a heat cleaning cycle.

BACKGROUND OF THE INVENTION

Field of the invention

Figure 1:
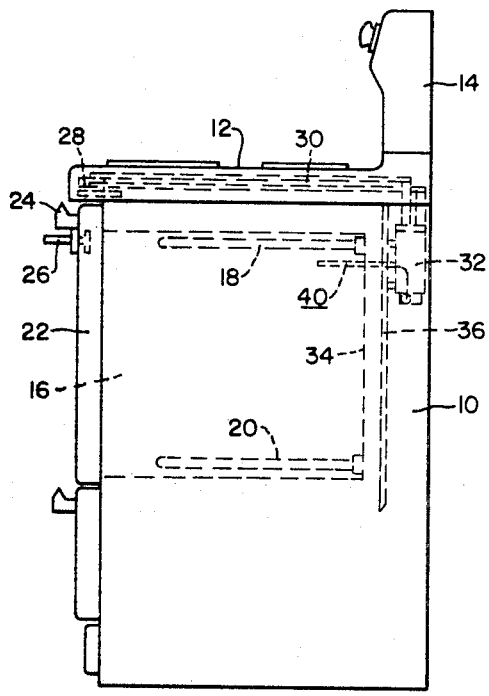

This invention pertains to the field of heat cleaning cooking ovens generally, and particularly to the thermostatic control of such ovens in a heat cleaning operation.

Description of the prior art

U.S. Patents 3,024,344, 3,027,444, 3,053,963, and 3,082,311 are examples of arrangements for protecting conventional hydraulic thermostats from the relatively high oven temperatures developed during a cleaning cycle of a domestic cooking oven. Some arrangements may include the provision of a physical shield which is located in protecting relation to the thermostat bulb during a heat cleaning cycle and is moved or detached from such a location for normal cooking operations. Others include means for introducing a draft of cooling air over the thermostat during the heat cleaning cycle along with the provision of the movable shield. The purpose of these arrangements of course is to limit the temperature of the thermostat bulb itself to a temperature which is not substantially higher than that encountered in normal cooking operations, and preventing the bulb from reaching the temperatures in the oven cavity during heat cleaning. The expectation which gave rise to these arrangements, and which so far as I know has been unrealized, was that the ordinary hydraulic thermostat, conventionally used in cooking ovens not adapted to undergo a heat cleaning operation, might possibly be also used satisfactorily in a cooking oven of the heat cleaning type. It has developed that of the heat cleaning ovens currently marketed, so far as I know, none employ the ordinary hydraulic thermostats with which the noted patents are concerned. Instead, electrical thermostatic control systems using variable-resistance temperature sensors are used in most heat cleaning ovens today. Thus the need for using an ordinary hydraulic thermostat has ostensibly vanished since the electrical thermostat system is adapted to control the heating means in the oven for both normal cooking temperatures, and for heat cleaning temperatures, through electrical circuitry which effectively resets the temperature at which the oven control operates in accordance with the operation it is to undergo.

While the electrical thermostat control system for controlling normal cooking temperatures, as well as heat cleaning temperatures, functions quite satisfactorily, one drawback is that the typical electrical thermostat control system is required to undergo a lengthy and complex calibration procedure because of the dual temperature operation, unless the manufacturer is prepared to pay a premium for a matched component system. Thus, there is merit in using an electrical thermostat control system which is only required to control cooking temperatures in the oven.

In one such prior art system, the electrical thermostat control system functions directly to control the energization of the heating means in the oven only in the cooking temperature range. The control system is effectively bypassed from exerting direct control in the heat cleaning temperature range, and a separate high temperature thermostat controls the oven heating in the heat cleaning range of temperatures. That arrangement employs a rod and tube type thermostat in those heat cleaning ovens of the character in which the oven temperature is raised to a range of 1000°–1100° F. to carry out the cleaning operation. It will be understood that most of the currently marketed heat cleaning ovens are provided with a lower control point in the range of about 850° to 900° F. with the oven temperatures ranging between about 820–930° F. for the period of heat cleaning operation. Since the higher temperature ovens (1000°–1100° F.) clean more quickly, they are designed to have a correspondingly shorter heat cleaning period than the lower temperature ovens. However, to insure uniformly adequate cleaning when using the higher temperatures and the shorter period, it will be appreciated that the functioning of the thermostat which controls the heating means during the cleaning period be reasonably reliable. Further, from the standpoint of cost considerations, the reliability of the heat cleaning cycling themostat preferably should be sufficiently reliable that no installed calibration is necessary and 100% testing of the operation of the thermostat in a heat cleaning range is not required. Experience has shown that the rod and tube thermostats for controlling the heat cleaning operation do not meet these desired characteristics of reliability.

SUMMARY OF THE INVENTION

A highly satisfactory thermostatic element, developed at my suggestion for use in a heat cleaning oven, is a mercury thermostat which possesses the characteristics of being extremely stable and highly reliable. However, mercury, being highly toxic, connotes hazard, particularly as to a location within a hot oven where any escaping mercury vapors might ultimately contact food. While it is believed that a suggestion as to undue hazard is unfounded in fact, because of the relatively small amount of mercury that may be used for satisfactory operation (about 0.01 cubic inch in a liquid state), the mere suggestion of a hazard can have adverse effects upon the marketing of the oven. Accordingly, the mercury-filled thermostatic element having the characteristics recognized as being desirable is located within the oven but within a hollow member. Thus the element is adequately responsive to overall oven temperatures while also being protected from inadvertent damage by the oven user. The hollow member also introduces a slight lag in response to intermittent combustion conditions in the oven to prevent the heat cleaning from premature termination. The mercury-filled thermostatic element may be made of a size to fit in a hollow tube diametrically no larger than the diameter of the previously used rod and tube sensing element for convenient field change. To facilitate the installation of the sensing element, the hollow tube is provided with an outer open end portion which projects rearwardly through the oven insulation. Thus the sensing element may be readily inserted by the installer through the visually observable open end and into the tube portion projecting into the oven. Also, a mark is provided on the capillary tube a measured distance from the sensing element to indicate to the installer when the bulb is fully forward in the tube. It is currently preferred that the inner end of the tube (i.e., the end within the oven confines) is closed.

It has been found that the reliability of the mercury thermostat is sufficient that only sample testing as to its operation at the proper temperature is required on the finished oven. This provides substantial cost advantages as compared to a system which requires either or both calibration and 100% testing.

DRAWING DESCRIPTION

Figure 2:
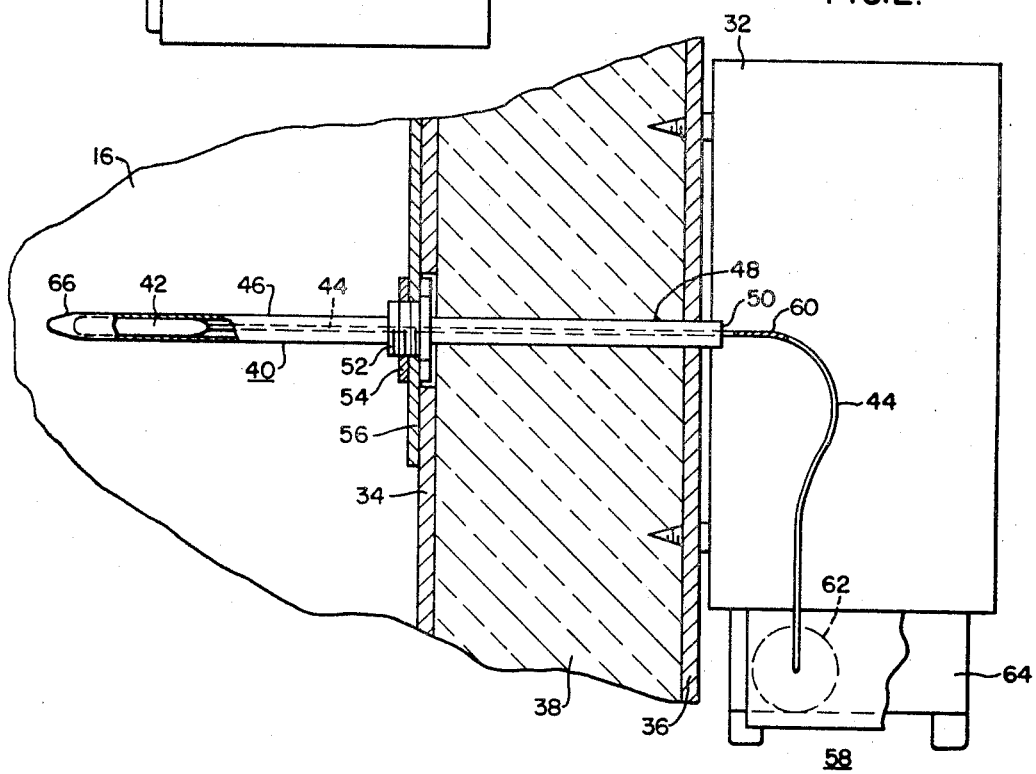

FIG. 1 is a side elevational view of the range of the heat cleaning type incorporating the invention; and FIG. 2 is a fragmentary, vertical sectional view, substantially enlarged relative to FIG. 1, illustrating the relationship of parts of the mercury thermostatic control arrangement with the oven and oven control parts.

DESCRIPTION OF THE PREFERRED EMBODIMENT

The domestic cooking range of FIG. 1, illustrated for the purposes of example, includes an outer housing 10 supporting a top wall cooking surface 12 and a rear control panel 14 extending along the top rear edge of the range. The outer housing encloses an inner liner defining a forwardly-open oven cavity 16 provided with top and bottom heating elements 18 and 20, respectively. The oven is adapted to be closed by the hinged drop door 22. A fixed handle 24 extends across the width of the door near its top edge and is used for opening and closing the door during normal cooking operations. An operable handle 26 is mounted closely below the fixed handle. By rotating the operable handle 26 about a quarter turn, a bolt is turned up to project out of the top edge of the door and engage a keeper assembly 28 mounted on the oven framing structure. The bolt latches the door shut for a heat cleaning operation. Latching the oven door 22 shut also operates through linkage 30 to place the latch-lock assembly control means 32 in a condition for effecting a subsequent locking of the door as the heat cleaning cycle proceeds, and permits the heat cleaning cycle to be initiated.

Detailed description of the structure and operation of a heat cleaning oven in which my invention may be incorporated, for example, are to be found in my U.S. patent application Ser. No. 545,894, and other commonly assigned U.S. patent applications Ser. No. 552,663, Ser. No. 546,093 and Ser. No. 545,967. These patent applications treat the general theory of preferred operation, specific circuitry for control, and the mechanisms for accomplishing latching, locking and timing in connection with the control.

For present purposes of description, it should be adequate to know that the thermostatic control arrangement of my invention involves only that part controlling the oven heating means in a heat cleaning temperature range. Thus, assuming a cycling type of control, the heating means is deenergized and then energized as the oven cavity temperature sensed by the thermostat rises above, and falls below, respectively, the limits of the temperature differential of the thermostat in the cleaning cycle. It will be appreciated of course, that a cycling operation is not a requirement for the application of this thermostat if a single heat-up and then complete shutdown type of operation is used.

From the foregoing then it will be understood that the thermostat of this invention may be incorporated in the circuitry of the noted applications in place of the high limit thermostat found therein. When the thermostat senses the set point temperature of, say, 1050° F. (currently preferred in the commercial embodiments in which my invention is found) the oven heating means is deenergized. Then when the oven cavity temperature sensed by the thermostat drops below about 1030° F., the oven heating means is again energized. Timing means is typically used to finally shut down the oven heating after a predetermined duration, or in a single heat-up cycle the thermostat itself may effect the final shut down.

Referring to FIGS. 1 and 2, the rear of the oven cavity 16 is defined by a vertical wall 34. A parallel wall 36 is spaced rearwardly from wall 34. These walls define the space occupied by thermal insulation 38. The hollow tube 40 into which the thermostat sensing bulb and a portion of the connecting capillary 44 are inserted, projects through openings in both walls and is secured so that a hollow tube inner portion 46 of about two and a half to three inches is exposed to the oven cavity space. The tube outer portion 48 is of sufficient length to extend out through the insulation and wall 36, and has an outer open end 50 which is visible and easily accessible from the rear of the range. It will be appreciated that the accessibility of the open end 50 at wall 36 facilitates the insertion of the thermostat bulb without hunting through the insulation. The wall 36 of course also provides additional support for the tube.

While other arrangements for securing the tube in place may be devised, the currently preferred arrangement shown in FIG. 2 includes a threaded bushing 52 brazed to the tube at an intermediate location, and a mounting nut 54 turned onto the bushing threads. The shoulder of the bushing abuts the rear face of the mounting plate 56 secured to the wall 34, and the nut is then turned onto the threads from the oven cavity side.

The part of the capillary 44 which extends out of the rear open end 50 of the hollow tube, with the bulb 42 fully forward in the tube, extends to a switch assembly 58 mounted on the bottom of the control box 32. A dab of paint 60 or other marking is applied to the tube 44 a measured distance from the bulb 42 when the thermostat assemblies are being made. Thus, during installation of the bulb and capillary into the hollow tube 40, it is easy to determine by the marking when the bulb 42 is fully forward.

The switch assembly 58 may be of generally conventional structure. The end of the capillary 44 opposite the bulb is open to a chamber 62 having a diaphragm movable to open and close electrical switch 64 in the circuit (not shown) controlling energization of the oven heating means. The thermostat bulb and capillary are charged with a quantity of mercury such that the required pressure for operating the electrical switch from its normally-closed position to an open position, is developed by the degree of vaporization of the mercury occurring when the thermostat senses about 1050° F. in the oven cavity. Opening the switch de-energizes the heating means so that the oven cavity will subsequently begin to cool. As the temperature of the oven cavity, as sensed by the thermostat, drops below about 1030° F., the decrease in pressure exerted by the mercury vapor results in the switch again closing. This cycling of the switch continues for the established period required for cleaning and then the heating of the oven cavity is fully terminated by timer operated switch means also in the circuit.

An example of a mercury filled thermostat providing satisfactory operation is that one currently identified as Catalog No. 10007, Model 603W, manufactured by Diatemp, Inc.

In the presently preferred form of thermostatic assembly, the inner end 66 of hollow tube 40 is completely closed and sealed relative to the oven cavity. Subsequent experience may indicate that it is not necessary that the end 66 be completely closed. However, with the complete sealing any possibility of escape of mercury into the oven cavity if the bulb or capillary should be ruptured is prevented.

The thermostat arrangement described herein not only provides for the physical protection of the mercury thermostat, but also provides for a limited delay in the response of the thermostat. During the heat cleaning process, some of the food particles being decomposed may occasionally burst into flame and provide rapid localized heating for the short time. Since the mercury thermostat has small mass, it has a fast response rate. Without the delay afforded by the protection means for the thermostat bulb, the combustion could cause premature termination of the heating means. Since the flaming in the oven rapidly uses up the oxygen necessary to support it, the flaming is self-extinguishing and of short duration. The tube normally provides sufficient delay in the response of the thermostat to avoid the premature termination of the heat cleaning cycle. This delay response feature of my thermostatic arrangement is of special significance in a non-cycling heat cleaning operation in which the heating is completed when the thermostat first senses its set point temperature.

Some of the supplemental advantages of my thermostat arrangement as embodied in commercial apparatus are also of significance and will be appreciated in light of the following. The relatively small size of the mercury thermostat permits the use of a hollow tube which is of approximately the same diameter (about $10/32$ in.) as the prior art rod and tube thermostat. This allows its installation in the same oven location and also facilitates the repair of units in the field by the simple replacement of the original thermostat by the tube and mercury thermostat arrangement. Also, the mercury thermostat arrangement may be handled with only the normal amount of care without fear of disturbing its temperature setting, whereas the rod and tube type thermostat is subject to having its calibration easily disturbed.

I claim as my invention:

1. In a cooking oven of the character adapted to undergo a heat cleaning operation with oven temperatures in a range substantially above normal cooking oven temperatures, and including wall means defining the interior cooking cavity of the oven, with heating means in said cavity, a thermostat system for controlling the high cleaning temperatures, comprising:
   a fixed tube having an outer open end, and disposed to project through said wall means to provide an inner tube portion located in said cavity with said inner tube portion exposed in uninsulated relation to the heated air in said cavity; and
   a mercury filled temperature sensing element for controlling operation of said heating means in response to oven cavity temperature variations in said cleaning temperature range, said element being disposed in said inner tube portion to respond to and assume oven cavity air temperatures at a rate delayed by the shielding effect of said inner tube portion to prevent termination of said heating in response to intermittent combustion in said cavity.

2. Apparatus according to claim 1 wherein:
   said tube includes a sealed inner end to preclude direct communication between the space within said tube and said oven cavity.

3. Apparatus according to claim 1 wherein:
   said oven includes insulating material about said wall means; and
   means mounting said tube to said wall means at an intermediate location of said tube so that the outer portion of said tube extends out of said wall means through said insulating material to expose the outer end of said tube.

4. Apparatus according to claim 3 wherein:
   said sensing element comprises a bulb, and connected capillary received into said hollow tube from said outer end, said capillary tube including indicia means thereon spaced from said bulb end a distance locating said indicia adjacent said outer open end when said bulb has been fully inserted in said hollow tube.

References Cited

UNITED STATES PATENTS

| | | |
|---|---|---|
| 1,702,854 | 2/1929 | Simonds. |
| 2,577,902 | 12/1951 | McGrath _____ 236—99 X |
| 3,053,963 | 9/1962 | Dills _____ 236—15 |
| 3,082,311 | 3/1963 | Chisholm _____ 126—273 X |
| 3,237,296 | 3/1966 | Weber _____ 236—99 X |
| 3,286,080 | 11/1966 | Lewis _____ 219—393 |

ROBERT A. O'LEARY, *Primary Examiner.*

W. E. WAYNER, *Assistant Examiner.*